United States Patent
Haag

(10) Patent No.: US 7,360,931 B2
(45) Date of Patent: Apr. 22, 2008

(54) DISPLAY DEVICE FOR A MOTOR VEHICLE

(75) Inventor: Peter Haag, Billigheim (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/504,309

(22) PCT Filed: Jan. 31, 2003

(86) PCT No.: PCT/DE03/00272

§ 371 (c)(1),
(2), (4) Date: Apr. 13, 2005

(87) PCT Pub. No.: WO03/072393

PCT Pub. Date: Sep. 4, 2003

(65) Prior Publication Data

US 2005/0180152 A1  Aug. 18, 2005

(30) Foreign Application Priority Data

Feb. 21, 2002  (DE) .............................. 102 07 475
Mar. 24, 2002  (DE) .............................. 102 23 119

(51) Int. Cl.
*B60Q 1/26* (2006.01)
(52) U.S. Cl. .................... 362/494; 362/492; 362/503; 362/545; 219/202; 219/219

(58) Field of Classification Search ................ 362/494, 362/503, 545, 492; 219/202, 219
See application file for complete search history.

(56) References Cited

U.S. PATENT DOCUMENTS

| 2,461,315 | A |   | 2/1949 | De Virgilis | |
|---|---|---|---|---|---|
| 5,786,772 | A | * | 7/1998 | Schofield et al. | 340/903 |
| 6,476,358 | B1 | * | 11/2002 | Lang et al. | 219/219 |
| 2001/0024370 | A1 | * | 9/2001 | Macher et al. | 362/492 |
| 2001/0036081 | A1 | * | 11/2001 | Gilbert et al. | 362/494 |
| 2004/0114262 | A1 | * | 6/2004 | Boddy et al. | 359/877 |

FOREIGN PATENT DOCUMENTS

| DE | 40 15 329 | 11/1991 |
|---|---|---|
| DE | 101 25 426.1 | 5/2001 |
| EP | 1 053 911 | 11/2000 |
| FR | 1 461 419 | 2/1966 |
| FR | 2 798 335 | 3/2001 |

* cited by examiner

*Primary Examiner*—Stephen F Husar
*Assistant Examiner*—Meghan K. Dunwiddie
(74) *Attorney, Agent, or Firm*—Kenyon & Kenyon LLP

(57) ABSTRACT

Indicating device for a motor vehicle, having at least one lighting element that is mounted in the housing of a mirror, for example by gluing it onto the mirror glass from the rear, and which illuminates the housing interior, making it only indirectly visible to the driver.

10 Claims, 1 Drawing Sheet

DISPLAY DEVICE FOR A MOTOR VEHICLE

BACKGROUND INFORMATION

In automotive engineering, there are a great many functions that operate indicators, for example, warning lights. One example of a function of this type is a blind spot detection system like the one described, for example, in unpublished German Patent Application No. 101 25 426.1, dated May 25, 2001. Using sensors, for example radar sensors, this detection system detects traffic participants in the blind spot zone and, if a traffic participant is detected in this zone, activates a warning light that is usually mounted internally on the A-pillar of the vehicle in the area of the outside rear-view mirror.

Other functions that operate indicators are, for example, parking aids or similar devices that visualize the distance from a vehicle to the rear and/or activate a warning light when the distance drops below a minimum value.

Due to their functions, indicators of this type must be designed so that the driver will not miss them in the particular situation. However, this could happen in the case of a blind spot detection system in which the warning light is mounted in the area of the A-pillar or in the case of parking aids having indicators in the area of the vehicle's multi-function instrument panel.

SUMMARY OF THE INVENTION

A main advantage of positioning indicator lighting elements so that they indirectly illuminate a mirror housing lies in the fact that no visible components are needed for indication purposes, nor is there any need for special components such as semi-transparent mirror glass. Non-transparent mirror glass may therefore continue to be used. Another advantage is that heating foils may continue to be used to defrost the mirror in the winter. A further advantage is that extensive modifications to the mirror housing are unnecessary, especially if the indicator elements are mounted on the mirror glass from the rear. In addition, a highly luminous, energy-efficient indicator may be implemented without blinding the driver.

The type of indicator that is combined with a blind spot warning system is especially advantageous since, even when a warning system is provided, the driver must keep his eyes on the outside rear-view mirror when changing lanes to detect vehicles farther back and refrain from changing lanes, if necessary. In this application, the indicator operates in the driver's direct field of vision in the event that he intends to change lanes.

The lighting elements are especially easy to mount by gluing them onto the mirror glass. Bright light-emitting diodes are advantageously used, which are especially economical to implement, while also having a high luminosity. The lighting elements may be alternatively or additionally positioned by embedding them in the mirror housing, for example, using a press-in fitting.

It is particularly advantageous to use multiple lighting elements that are mounted in the external area of the mirror, in the case of an outside rear-view mirror preferably on a part of the outside rear-view mirror facing away from the vehicle. This provides an especially efficient indicator that is particularly effective in alerting the driver, while simultaneously being outside the driver's permanent field of vision.

In other applications, for example in parking aids in which the light-emitting diodes may be mounted in the inside rear-view mirror and/or in the outside rear-view mirror, the advantages are the same.

DETAILED DESCRIPTION

Figure 1:
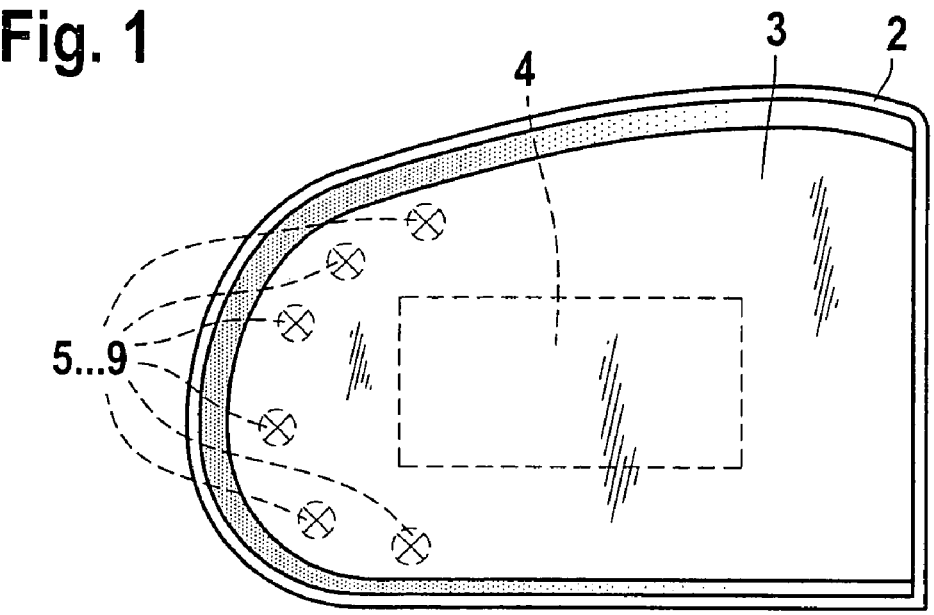
FIGS. 1 and 2 show a top view and a sectional view of an outside rear-view mirror of a motor vehicle in which lighting elements are mounted on the mirror glass.

FIG. 1 shows an outside rear-view mirror 1 that includes a mirror housing 2, a mirror glass 3, a positioning motor 4 for adjusting the mirror as well as lighting elements 5 through 9. In the illustrated exemplary embodiment, the lighting elements are mounted, preferably by gluing, onto the mirror glass from the rear, i.e., on the side of the glass that is not visible to the driver. These lighting elements are activated to alert the driver in certain situations, in the preferred exemplary embodiment by a blind spot detection system, when the latter detects a traffic participant in the vehicle's blind spot. In this situation, the lighting elements are made to light up, alerting the driver to the danger by indirectly illuminating the mirror housing.

In the preferred exemplary embodiment, the lighting elements are mounted in the external area of the outside rear-view mirror on the side facing away from the motor vehicle. This illuminates at least this part of the inner mirror housing and provides an indication that is detectable to the driver by correspondingly lighting up the visible edge of the housing past the mirror glass. The distance between the housing and mirror glass is usually the greatest in this area.

In other embodiments, the additional or alternative provision of lighting elements in other areas of the outside rear-view mirror, possibly using different colors, has proven to be suitable. This achieves a different, complete illumination of the inner mirror housing while maintaining a uniform distribution of lighting elements over the mirror glass surface, thus providing different indication patterns. A uniform distribution, for example, causes the entire edge of the mirror housing to be illuminated. The use of different colors thus makes it possible to convey different information.

In the preferred exemplary embodiment, lighting elements 5 through 9 are bright light-emitting diodes that are glued along with their supply leads onto the mirror glass from the rear. Via the positioning motor, the supply leads are routed along with the supply leads of the positioning motor into the motor vehicle interior.

The mirror glass is opaque, allowing a heating foil to be additionally mounted to defrost the mirror in the winter.

Figure 2:
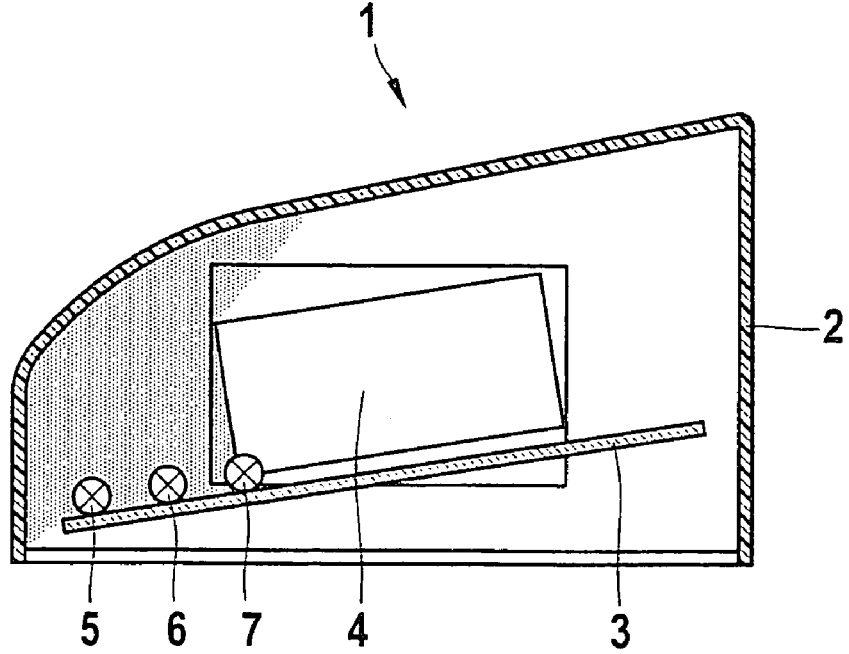

FIG. 2 shows a sectional view of the outside rear-view mirror illustrated in FIG. 1 on the mirror glass plane. Housing 2, mirror 3, positioning motor 4 as well as lighting elements 5, 6, and 7 are thus illustrated. Lighting elements 5, 6, and 7 are mounted onto mirror glass 3 from the rear, preferably by gluing. When activated, they illuminate mirror housing 2 within the light gray area, thus signaling the desired information, e.g., a warning of a traffic participant located in the blind spot, to the driver by illuminating the visible edge of the housing.

Instead of an application in conjunction with a blind spot detection system, corresponding indicator concepts are used in connection with other functions, for example parking aids, etc. This applies to all functions in which it is assumed that the driver checks the vehicle mirror to monitor the area to the rear of the vehicle. Depending on the embodiment, the indicator is used in a suitable selection of available mirrors or in all available mirrors.

The number and type of lighting elements used depends on the application. In the simplest case, a single lighting element is sufficient.

In addition or as an alternative to the above description, according to another embodiment, at least one lighting element is not mounted onto the mirror glass, but rather is embedded in the plastic mirror housing, e.g., by placing the at least one lighting element, such as an LED and all its connections, in the housing mold and injection-molding plastic around it while the housing is being manufactured. Another option is to incorporate the lighting element into a press-in fitting provided in the housing, the connections preferably being already provided in the housing.

Like in the preceding exemplary embodiment, it is important in this case to position the at least one lighting element so that the mirror housing is at least partially illuminated, thereby indirectly lighting up the housing interior past the glass.

What is claimed is:

1. An indicating device for a motor vehicle comprising:
    at least one lighting element that is activated for indication purposes, the at least one lighting element being mounted inside a housing of a mirror of the motor vehicle behind a non-transparent mirror glass of the mirror, the at least one lighting element being situated so that it directly illuminates an interior of the housing of the mirror,
    wherein a spatial separation exists between an edge of the non-transparent mirror glass of the mirror and a visible interior edge of the housing, and
    wherein the visible interior edge of the housing is illuminated for signaling information to the driver of the vehicle through the spatial separation.

2. The device according to claim 1, wherein the mirror is an outside rear-view mirror of the motor vehicle.

3. The device according to claim 1, wherein the at least one lighting element is mounted onto glass of the mirror from a rear.

4. The device according to claim 3, wherein the at least one lighting element is mounted by gluing.

5. The device according to claim 1, wherein the at least one lighting element is a bright light-emitting diode.

6. The device according to claim 1, wherein the at least one lighting element is situated so that it illuminates at least a part of the mirror housing.

7. The device according to claim 1, wherein the at least one lighting element is activated when a blind spot detection system detects a traffic participant in a blind spot of the motor vehicle.

8. The device according to claim 1, wherein the at least one lighting element is situated in an area of an outside rear-view mirror that faces away from the vehicle.

9. The device according to claim 1, wherein the mirror has glass that is non-transparent and is covered by a heating foil for defrosting the glass in the winter.

10. The device according to claim 1, wherein the at least one lighting element is embedded in the mirror housing in such a way that the at least one lighting element at least partially illuminates the mirror housing.

\* \* \* \* \*